(12) United States Patent
Morita et al.

(10) Patent No.: US 8,835,047 B2
(45) Date of Patent: Sep. 16, 2014

(54) NEGATIVE ELECTRODE ACTIVE MATERIAL FOR NON-AQUEOUS ELECTROLYTE SECONDARY BATTERY CELL, NON-AQUEOUS ELECTROLYTE SECONDARY BATTERY CELL, BATTERY PACK AND METHOD FOR MANUFACTURING THE NEGATIVE ELECTRODE ACTIVE MATERIAL FOR NON-AQUEOUS ELECTROLYTE SECONDARY BATTERY CELL

(75) Inventors: Tomokazu Morita, Funabashi (JP); Norio Takami, Yokohama (JP); Takashi Kuboki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/534,206

(22) Filed: Jun. 27, 2012

(65) Prior Publication Data

US 2013/0078490 A1 Mar. 28, 2013

(30) Foreign Application Priority Data

Sep. 27, 2011 (JP) .................................. 2011-211658

(51) Int. Cl.
*H01M 4/02* (2006.01)

(52) U.S. Cl.
USPC ...................... 429/209; 429/231.4; 429/231.8

(58) Field of Classification Search
USPC .............................. 429/92, 209, 231.4, 231.8
See application file for complete search history.

(56) References Cited

U.S. PATENT DOCUMENTS 7,303,838 B2 12/2007 Morita et al.

| 2003/0129494 | A1 | 7/2003 | Kaneda et al. |
| 2003/0215711 | A1 | 11/2003 | Aramata et al. |
| 2006/0068287 | A1 | 3/2006 | Morita et al. |
| 2007/0190412 | A1* | 8/2007 | Chiga et al. .................... 429/200 |
| 2010/0075227 | A1* | 3/2010 | Morita et al. .............. 429/231.8 |

FOREIGN PATENT DOCUMENTS

| CN | 101439972 A | 5/2009 |
| JP | 2000-90916 | 3/2000 |
| JP | 2004-119176 | 4/2004 |
| JP | 2006-92969 | 4/2006 |
| JP | 2009-205950 | 9/2009 |

OTHER PUBLICATIONS

Office Action issued Jun. 19, 2014, in CN Patent application No. 201210226105.X with English language translation.
Office Action issued Jun. 27, 2014, in Japanese Patent Application No. 2011-211658, filed Jun. 23, 2014 (with English-language Translation).

* cited by examiner

*Primary Examiner* — Jane Rhee
(74) *Attorney, Agent, or Firm* — Oblon, Spivak, McClelland, Maier & Neustadt, L.L.P.

(57) ABSTRACT

According to one embodiment, a negative electrode active material for a non-aqueous electrolyte secondary battery cell includes a composite. The composite includes a carbonaceous material, a silicon oxide dispersed in the carbonaceous material, and a silicon dispersed in the silicon oxide. A half-value width of a diffraction peak of a Si (220) plane in powder X-ray diffraction measurement of the composite is in a range of 1.5° to 8.0°. A mean size of a silicon oxide phase is in a range of 50 nm to 1,000 nm. A value of (a standard deviation)/(the mean size) is equal to or less than 1.0 where the standard deviation of a size distribution of the silicon oxide phase is defined by (d84%−d16%)/2.

12 Claims, 5 Drawing Sheets

US 8,835,047 B2

NEGATIVE ELECTRODE ACTIVE MATERIAL FOR NON-AQUEOUS ELECTROLYTE SECONDARY BATTERY CELL, NON-AQUEOUS ELECTROLYTE SECONDARY BATTERY CELL, BATTERY PACK AND METHOD FOR MANUFACTURING THE NEGATIVE ELECTRODE ACTIVE MATERIAL FOR NON-AQUEOUS ELECTROLYTE SECONDARY BATTERY CELL

CROSS-REFERENCE TO RELATED APPLICATION(S)

This application is based upon and claims the benefit of priority from Japanese Patent Application No. 2011-211658, filed Sep. 27, 2011; the entire contents of which are incorporated herein by reference.

BACKGROUND

1. Technical Field

Embodiments described herein relate generally to a negative electrode active material for a non-aqueous electrolyte secondary battery cell, a non-aqueous electrolyte secondary battery cell, a battery pack and a method for manufacturing a negative electrode active material for a non-aqueous electrolyte secondary battery cell.

2. Description of the Related Art

Recently, with the rapid development of miniaturization technology of electronic devices, various portable electronic have been in wide-spread use. Also, as miniaturization is also required in batteries serving as power sources for the portable electronic devices, non-aqueous electrolyte secondary batteries having a high energy density draw attention.

In particular, attempts have been made to use a material having a high lithium absorption capacity and a high density, for example, an element which forms an alloy with lithium, such as silicon and tin, amorphous chalcogen compounds, and the like. Among them, silicon may absorb lithium atoms in a ratio up to 4.4 atoms per one silicon atom, and the negative electrode capacity per mass is about 10 times as large as that of graphitic carbon. However, since the volume of silicon greatly varies due to intercalation and deintercalation of lithium in a charge-discharge cycle, particles of the active materials are finely pulverized, which would affect cycle life of a battery.

DETAILED DESCRIPTION

Figure 1:
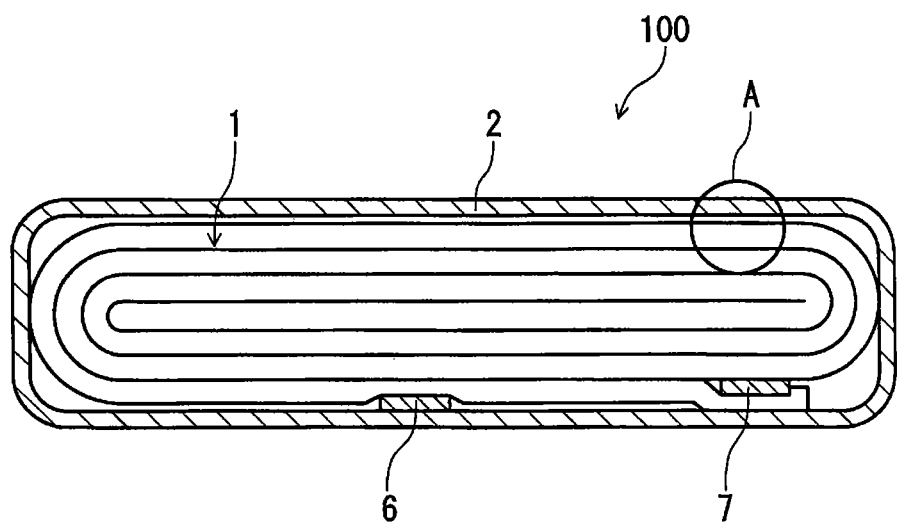
FIG. 1 is an exemplary section view showing a flat-type non-aqueous electrolyte battery cell according to a second embodiment.

Hereinafter, various embodiments will be described with reference to the accompanying drawings.

First Embodiment

According to a first embodiment, a negative electrode active material for a non-aqueous electrolyte secondary battery cell includes a composite. The composite includes a carbonaceous material, a silicon oxide dispersed in the carbonaceous material, and a silicon dispersed in the silicon oxide. A half-value width of a diffraction peak of a Si (220) plane in powder X-ray diffraction measurement of the composite is in a range of 1.5° to 8.0°. A mean size of a silicon oxide phase is in a range of 50 nm to 1,000 nm. A value of (a standard deviation)/(the mean size) is equal to or less than 1.0 where the standard deviation of a size distribution of the silicon oxide phase is defined by (d84%−d16%)/2.

In the negative electrode active material according to the first embodiment, the composite may include Si, silicon oxide and the carbonaceous material, which are finely composited particles. The mean size of the silicon oxide phase containing Si may be in a range of 50 nm to 1,000 nm. The silicon oxide phase may be uniformly dispersed in the carbonaceous material in a state where (the standard deviation of the particle distribution of the silicon oxide phase)/(the mean size of the silicon oxide phase) is equal to or less than 1.0 where the standard deviation of the particle distribution of the silicon oxide phase is defined as (d84%−d16%)/2.

The Si phase intercalates and deintercalates large amounts of lithium to promote a significant increase in the capacity of the negative electrode active material. The expansion and shrinkage by intercalating and deintercalating large amounts of lithium in the silicon phase are alleviated by dispersing the silicon phase in the other two phases to prevent the active material particles from being pulverized. Further, the carbonaceous material phase secures conductivity which is important for the negative electrode active material. The silicon oxide phase is firmly combined with Si to be effective in maintaining the structure of the particle as a buffer holding the pulverized Si.

The Si phase has a large expansion and shrinkage during absorption and release of lithium. Thus, the Si phase may be pulverized and dispersed as much as possible in order to relax the stress. Specifically, particles may be dispersed so as to have a size in a range of a cluster size of several nanometers (nm) to 100 nm at most.

The silicon oxide phase may adopt an amorphous or crystalline structure. The silicon oxide phase may be dispersed in the active material particles without uneven distribution in such a state that the silicon oxide phase is bonded to the Si phase and contain or hold the Si phase. However, as microcrystalline Si contained in the silicon oxide repeatedly change volume due to absorbance and release of Li during charge and discharge, the microcrystalline Si is bound to each other to grow the crystallite size, thereby causing a reduction in capacity and initial charge-discharge efficiency. Therefore, the first embodiment improves the life characteristics by making the silicon oxide phase small and uniform in size so as to inhibit the growth of the crystallite size of microcrystalline Si to suppress the deterioration in capacity due to charge-discharge cycles. The silicon oxide phase may have a mean size in a range of 50 nm to 1,000 nm. If the mean size exceeds the upper limit of the range, it is difficult to achieve the inhibition effects of the size growth of microcrystalline Si. Further, if the mean size falls below the lower limit of the range, it is difficult to disperse the silicon oxide phase when the active material is prepared. And, simultaneously, rate characteristics is deteriorated due to reduction in conductivity as an active material, and the initial charge-discharge capacity efficiency is deteriorated. The mean size of the silicon oxide phase may be in a range of 100 nm to 500 nm. In this case, excellent life characteristics are achieved. In addition, in order to obtain excellent characteristics of the active material as a whole, the size of the silicon oxide phase may be uniform. (The standard deviation of the particle distribution of the silicon oxide phase)/(the mean size of the silicon oxide phase) is equal to or less than 1.0 where the standard deviation of the particle distribution of the silicon oxide phase is defined by the expression of (d84%–d16%)/2, d16% denotes the particle diameter at cumulative percentages of 16% in the cumulative volume based particle size distribution, and d84% denotes the particle diameter at cumulative percentages of 84% in the cumulative volume based particle size distribution.

The carbonaceous material which forms the composite material with the Si phase in the particle may be graphite, hard carbon, soft carbon, amorphous carbon or acetylene black. The carbonaceous material may include one or more of them. It is preferable the carbonaceous material includes only graphite or a combination of graphite and hard carbon. Graphite is preferable in terms of improving the conductivity of the active material, and has a large effect of relaxing the expansion and contraction by coating the entire hard carbon active material. The carbonaceous material may have such a shape that encapsulates the Si phase and the silicon oxide phase. Further, A composite in which the silicon oxide phase of fine particles is dispersed may include carbon fibers in order to maintain the structure of particles and prevent the aggregation of the silicon oxide phase to ensure conductivity. Therefore, it is effective if a diameter of the carbon fibers to be added is equal to that of the silicon oxide phase. The carbon fibers may have a mean diameter in a range of 50 nm to 1,000 nm. Preferably, the carbon fibers have the mean diameter in a range of 100 nm to 500 nm. An amount of the carbon fibers contained the composite material may be in a range of 0.1% by mass to 8% by mass. Preferably, the amount of the carbon fibers contained the composite material is in a range of 0.5% by mass to 5% by mass.

Further, lithium silicate such as $Li_4SiO_4$, or the like may be dispersed on or in a surface of the silicon oxide phase or in the silicon oxide phase. It is considered that the lithium salt which is added to the carbonaceous material is subjected to thermal treatment to cause a solid reaction with the carbon oxide phase in the composite, thereby forming lithium silicate $SiO_2$ precursors and Li compounds may be added to the structural carbonaceous material that covers the Si phase and the silicon oxide phase. The carbonaceous material is firmly combined with $SiO_2$ to be produced from silicon monoxide by adding $SiO_2$ precursors and Li compounds to the carbonaceous material. And, at the same time, $Li_4SiO_4$ having excellent Li ion conductivity is produced in the silicon oxide phase. Examples of the $SiO_2$ precursors include alkoxide such as silicon ethoxide. Examples of the Li compounds include lithium carbonate, lithium oxide, lithium hydroxide, lithium oxalate, lithium chloride, and the like.

The negative electrode active material may have a particle diameter in a range of 5 μm to 100 μm. Also, the negative electrode active material may have a specific surface area of 0.5 $m^2/g$ or more and 10 $m^2/g$ or less. The active material may exhibit stable characteristics thereof when the particle diameter and specific surface area of the active material fall in the above ranges, even though these values affect the rate of the intercalation and deintercalation reaction of lithium, and have a great influence on the characteristics of the negative electrode.

Further, the half-value width of the diffraction peak at the Si (220) plane in the powder X-ray diffraction measurement of the active material may be in a range of 1.5° to 8.0°. The half-value width of the diffraction peak at the Si (220) plane decreases as the crystal particle of the Si phase grows. When the crystal particles of the Si phase grow largely, the active material particles are easily cracked due to the expansion and shrinkage caused by the intercalation and deintercalation of lithium. For this reason, when the half-value width falls in the range of 1.5° to 8.0°, the situation where such a phenomenon arises may be avoided.

A ratio of the Si phase, the $SiO_2$ phase, and the carbonaceous material may be in a range of 0.2≤Si/carbon≤2 in terms of the molar ratio between Si and carbon. The quantitative relationship between the Si phase and the $SiO_2$ phase may be 0.6≤Si/$SiO_2$≤1.5 in terms of the molar ratio. This is because a large capacity and excellent cycle characteristics can be obtained as a negative electrode active material.

(Preparation Method)

Figure 5:
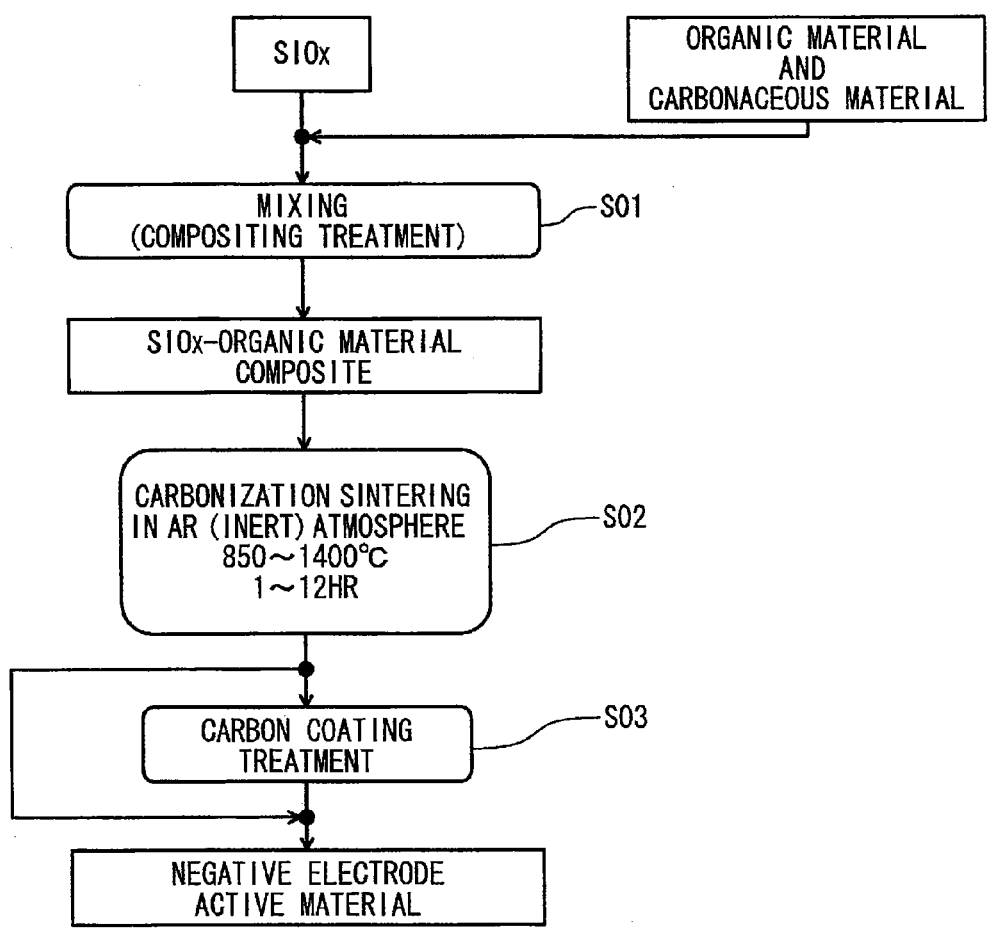
FIG. 5 is an exemplary flowchart of a method for preparing a negative electrode active material according to the first embodiment.

Next, a method for preparing a negative electrode active material for a non-aqueous electrolyte secondary battery cell according to the first embodiment will be described. FIG. 5 shows a preparing sequence.

The negative electrode active material according to the first embodiment may be synthesized by mixing raw materials by means of mechanical treatment, stirring treatment and the like with the raw materials being in a solid phase or a liquid phase and by sintering the mixed raw materials.

(Compositing Treatment: S01)

In compositing treatment, a SiO raw material is mixed with an organic material having graphite and a carbon precursor to form a composite.

As an SiO raw material, SiOx (0.8≤X≤1.5) may be used. In particular, SiO (X≈1) may be used so as to achieve a quantitative relationship between the Si phase and the $SiO_2$ phase at a preferred ratio. Further, $SiO_x$ may be pulverized when being mixed. However, in order to reduce the processing time and form the silicon oxide phase having a uniform size, a material which is finely pulverized in advance may be used. Such fine powder may be obtained by using a continuous bead mill, a planetary ball mill, or the like. In this case, SiOx may have a mean particle diameter in a range of 50 nm to 1,000 nm. Furthermore, uniform $SiO_x$ having a mean particle diameter of 100 nm to 500 nm may be used.

As an organic material, at least one of carbon materials such as graphite, coke, a low temperature baked carbon, pitch, and the like and carbon material precursors may be used. In particular, a material which, is melted by heating, such as pitch, would be melted and not be composite well during mechanical mill treatment. Thus, such a material may be mixed and used with another material which is not melted, such as coke or graphite.

Examples of the mechanical compositing treatment include turbo mill, ball mill, mechanofusion, disk mill, and the like.

Although operating conditions of the mechanical compositing treatment vary depending on devices, it is preferable to perform the mechanical compositing treatment until pulverization and compositing are sufficiently made. However, if output is excessively increased or too much time is spent during the compositing, Si and C are reacted, and thus, SiC which is inert to the intercalation reaction of Li is produced. Therefore, for the treatment conditions, it is necessary to set an appropriate condition under which the pulverization and compositing are sufficiently made and SiC is not produced.

A method for compositing by performing mixing and stirring treatments in a liquid phase will be described below. The mixing and stirring treatment may be performed by, for example, various stirring devices, ball mill, bead mill devices, or a combination thereof. The compositing of silicon monoxide of fine particles with a carbon precursor and a carbonaceous material may be performed as liquid phase mixing in liquid using a dispersion medium. This is because it is difficult to disperse silicon monoxide of fine particles and a carbon precursor uniformly by a dry mixing device without aggregation. Organic solvents, water, or the like may be used as a dispersion medium. However, it is preferable to use liquid having excellent affinity of silicon monoxide with both of the carbon precursor and the carbonaceous material. Examples thereof include ethanol, acetone, isopropyl alcohol, methyl-ethyl ketone, ethyl acetate, and the like. Further, it is preferable that the carbon precursor is liquid or is soluble in a dispersion medium during the mixing step so that the carbon precursor is uniformly mixed with the fine particles of silicon monoxide. It is more preferable that the carbon precursor is a monomer or oligomer, which is liquid and is easily polymerizable. Examples thereof include organic materials to form a furan resin, a xylene resin, a ketone resin, an amino resin, a melamine resin, an urea resin, an aniline resin, a urethane resin, a polyimide resin, a polyester resin, a phenol resin, and the like. The material mixed in the liquid phase is solidified or subjected to a dry process to form a $SiO_x$-organic material composite.

(Carbonization Sintering Treatment: S02)

A carbonization sintering treatment is carried out under an inert atmosphere such as in Ar or the like. In the carbonization sintering, a carbon precursor such as a polymer, pitch, or the like in the $SiO_x$-organic material composite is carbonized while simultaneously $SiO_x$ is separated into two phases of Si and $SiO_2$ by a disproportionation reaction. When X=1, the reaction is represented by the following Formula (1).

$$2SiO \rightarrow Si + SiO_2 \quad (1)$$

The disproportionation reaction proceeds at temperatures higher than 800° C., and the reactants are separated into the fine Si phase and the $SiO_2$ phase. As the reaction temperature increases, the crystals of the Si phase become large and a half-value width of the Si(220) peak gets small. The sintering temperature at which a half-value width in a preferable range may be obtained is in a range of 850° C. to 1,600° C. Further, Si produced by the disproportionation reaction reacts with carbon at temperatures higher than 1,400° C. to change into SiC. SiC is completely inert to the intercalation of lithium. Therefore, if SiC is produced, the capacity of the active material is deteriorated. Accordingly, the temperature of the carbonization sintering is preferably in a range of 850° C. to 1,400° C., and more preferably in a range of 900° C. to 1,100° C. The sintering time is preferably in a range of 1 hour to 12 hours (Carbonization Coating Treatment: S03)

As a next process, carbon coating may be performed on particles obtained by the compositing treatment. As a material used for coating, a material, such as pitch, a resin, a polymer, or the like, which turns into a carbonaceous material when being heated under an inert atmosphere may be used. Specifically, materials which are well carbonized during sintering at about 1,200° C., such as petroleum pitch, mesophase pitch, a furan resin, cellulose, or rubbers, are preferable. As described in the section of the sintering treatment, this is because it is impossible to perform sintering at temperatures higher than 1,400° C. According to the coating method, a material, in which composite particles dispersed in monomers are polymerized and solidified, is used in the carbonization sintering. Alternatively, a solid material obtained by dissolving a polymer in a solvent, dispersing composite particles in the solvent, and then evaporating the solvent may be used in the carbonization sintering. Also, as another method, carbon coating may be performed using CVD. In this method, the surface of a sample is carbonized by flowing carbon source gas on a sample heated to a temperature of 800° C. to 1,000° C. with inert gas being used as carrier gas. In this case, benzene, toluene, styrene, or the like may be used as the carbon source. In addition, when the carbon coating is performed by CVD, the sample is heated to a temperature of 800° C. to 1,000° C. Thus, the carbon coating is simultaneously performed with the carbonization sintering.

During the carbon coating, a lithium compound and a $SiO_2$ source may be simultaneously added.

A negative electrode active material according to the first embodiment may be obtained by the above synthesis method. From the product obtained after the carbonization sintering, the particle diameter, the specific surface area, and the like thereof may be adjusted by using various mills, pulverization devices, grinders, or the like.

Second Embodiment

A non-aqueous electrolyte secondary battery cell according to a second embodiment will be described.

The non-aqueous electrolyte secondary battery cell according to the second embodiment includes an outer case, a positive electrode housed in the outer case, a negative electrode that is separated from the positive electrode (for example, a separator is provided between the positive electrode and the negative electrode), that is housed in the outer case, and that has an active material, and a non-aqueous electrolyte filled in the outer case.

Figure 2:
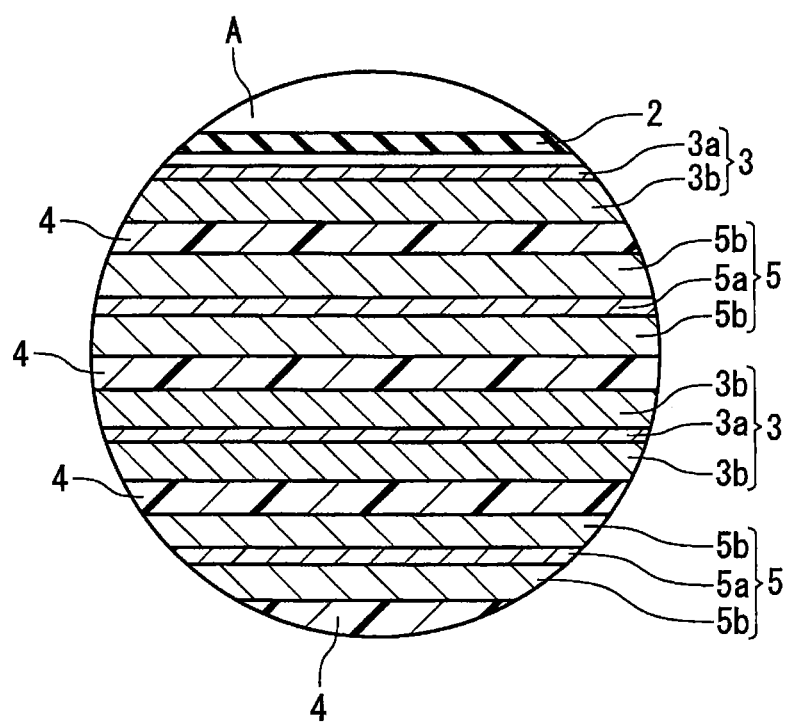
FIG. 2 is an exemplary enlarged section view of an A portion in FIG. 1.

An example of a non-aqueous electrolyte secondary battery cell 100 according to the second embodiment will be described in more detail with reference to FIGS. 1 and 2. FIG. 1 is an exemplary schematic section view of a flat-type non-aqueous electrolyte secondary battery cell 100 in which an outer case 2 is formed of a laminate film. FIG. 2 is an exemplary enlarged section view of an A portion in FIG. 1. Meanwhile, each drawing is a schematic view for explanation. Some portions may be drawn as having a shape, a dimension, a ratio, and the like different from those of actual portions. However, the designs of such portions may be appropriately changed by considering the following description and the related art.

A wound electrode group 1 having a flat shape is housed in a pouch-shaped case 2 formed of a laminate film, which includes two resin layers and an aluminum film disposed between the two resin layers. The wound electrode group 1 having the flat shape is formed by spirally winding a laminate in which a negative electrode 3, a separator 4, a positive electrode 5, and a separator 4 are laminated in this order from an external side, and by press-molding the laminate. The outermost negative electrode 3 has such a configuration that a negative electrode layer 3b is formed on the internal side of a negative electrode current collector 3a, as shown in FIG. 2. The other negative electrodes 3 are configured by, forming the negative electrode layers 3b on both sides of the negative electrode current collector 3a. An active material in the negative electrode layer 3b includes an active material for a battery cell according to the first embodiment. The positive electrode 5 is configured by forming positive electrode layers 5b on both sides of a positive electrode current collector 5a.

In the vicinity of an outer circumferential end of the wound electrode group 1, a negative electrode terminal 6 is electrically connected to the negative electrode current collector 3a of the outermost negative electrode 3, and a positive electrode terminal 7 is electrically connected to the inner-side positive electrode current collector 5a of the positive electrode 5. The negative electrode terminal 6 and the positive electrode terminal 7 are extended to an outside through an opening portion of the pouch-shaped case 2. For example, liquid-phase non-aqueous electrolyte is injected through the opening portion of the pouch-shaped case 2. The wound electrode group 1 and the liquid phase non-aqueous electrolyte are completely sealed by heat-sealing the opening portion of the pouch-shaped case 2 with the negative electrode terminal 6 and the positive electrode terminal 7 being sandwiched.

Examples of materials used as the negative electrode terminal 6 include aluminum, an aluminum alloy containing an element such as Mg, Ti, Zn, Mn, Fe, Cu, or Si. In order to reduce a contact resistance with the negative electrode current collector 3a, the negative electrode terminal 6 may be made of the same material as that of the negative electrode current collector 3a.

The positive electrode terminal 7 may employ a material having electrical stability and conductivity in a range of 3 V to 4.25 V of electric potential with respect to a lithium ion metal. Specific examples thereof include aluminum and an aluminum alloy containing an element such as Mg, Ti, Zn, Mn, Fe, Cu, or Si. In order to reduce a contact resistance with the positive electrode current collector 5a, the positive electrode terminal 7 may be formed of a material which is identical to that of the positive electrode current collector 5a.

Hereinafter, the outer case, the positive electrode, the negative electrode, the electrolyte, and the separator, which are constitutional elements of the non-aqueous electrolyte secondary battery cell 100, will be described in detail.

1) Outer Case

The outer case 2 is formed of a laminate film having a thickness of 0.5 mm or less. Alternatively, a metal container having a thickness of 1.0 mm or less may be used as the outer case. Preferably, the metal container may have a thickness of 0.5 mm or less.

The shape of the outer case 2 may be selected from a flat shape (foil type), an cubic shape, a cylindrical shape, a coin shape, and a button shape. Examples of the outer case include an outer case for a small battery cell to be mounted on a portable electronic device and the like, an outer case for a large battery cell to be mounted on two-wheeled to four-wheeled vehicles and the like, depending on the dimension of the battery cell.

As the laminate film, a multilayer film in which a metal layer is sandwiched between resin layers is used. The metal layer may be formed of an aluminum foil or an aluminum alloy foil for light-weighting of the battery cell. Examples of the resin layer include a polymer material such as polypropylene (PP), polyethylene (PE), nylon, or polyethylene terephthalate (PET). The laminate film may be molded into the form of an outer case by performing sealing with a thermal fusion bonding.

The metal container may be made of aluminum, an aluminum alloy or the like. The aluminum alloy preferably includes an element such as magnesium, zinc, silicon, or the like. When a transition metal such as iron, copper, nickel, chromium, or the like is included in the aluminum alloy, the amount thereof may be 100 mass ppm or less.

2) Positive Electrode

The positive electrode has a structure in which a positive electrode active material layer including an active material is provided on one side or both sides of a positive electrode current collector.

The thickness of the positive electrode active material layer on one side may be in a range of 10 μm to 150 μm from the viewpoint of maintaining high-current discharge characteristics and a cycle life of the battery cell. Accordingly, when the positive electrode active material is provide on the both sides of the positive electrode current collector, the positive electrode active material layer may have a total thickness in a range of 20 μm to 300 μm. Preferably, the thickness of the positive electrode material layer on one side may be in a range of 30 μm to 120 μm. When the thickness of the positive electrode material layer on one side falls in the range, the high-current discharge characteristics and cycle life are improved.

The positive electrode active material layer may include a conductive agent in addition to the positive electrode active material.

Further, the positive electrode active material layer may include a binding agent which binds the positive electrode materials to each other.

As the positive electrode active material, various oxides, such as a manganese dioxide, a lithium-manganese composite oxide, a lithium-containing nickel cobalt oxide (for example, $LiCoO_2$), a lithium-containing nickel cobalt oxide (for example, $LiNi_{0.8}CO_{0.2}O_2$), a lithium manganese composite oxide (for example, $LiMn_2O_4$ and $LiMnO_2$) may be used because a high voltage is obtained using these oxides.

Examples of the conductive agent include acetylene black, carbon black, graphite, and the like.

Specific examples of the binding agent include polytetrafluoroethylene (PTFE), polyvinylidene fluoride (PVdF), ethylene-propylene-diene copolymer (EPDM), styrene-butadiene rubber (SBR), and the like.

With regard to the blending ratio of the positive electrode active material, the conductive agent and the binding agent, the positive electrode active material may be in a range of 80% by mass to 95% by mass, the conductive agent may be in a range of 3% by mass to 20% by mass, and the binding agent may be in a range of 2% by mass to 7% by mass because good high-current performance and cycle life are obtained with these values.

As the current collector, a conductive substrate having a porous structure or non-perforated conductive substrate may be used. The thickness of the current collector may be in a range of 5 μm to 20 μm. This is because a good balance between the strength of the electrode and weight reduction is obtained if the thickness of the current collector falls in this range.

The positive electrode 5 is manufactured by suspending, for example, the active material, the conductive agent, and the binding agent in a solvent which is universally used to prepare slurry, applying and drying the slurry on the current collector 5a, and then pressing the slurry. The positive electrode 5 may also be manufactured by forming the active material, the conductive agent, and the binding agent into a pellet shape to make the positive electrode layer 5b and forming the positive electrode layer 5b on the current collector 5a.

3) Negative Electrode

The negative electrode has a structure in which a negative electrode active material layer including a negative electrode material is provided on one side or both sides of the negative electrode current collector. As the negative electrode active material, the negative electrode active material according to the first embodiment may be used.

The thickness of the negative electrode active material layer may be in a range of 10 μm to 150 μm. Accordingly, when the negative electrode active material is provided on both sides of the negative electrode current collector, the negative electrode active material layer has a total thickness in a range of 20 μm to 300 μm. Preferably, the thickness of the negative electrode active material layer on one side may be in a range of 30 μm to 100 μm. When the thickness of the negative electrode active material layer on one side falls in the range, high-current discharge characteristics and cycle life are greatly improved.

The negative electrode active material layer may include a binding agent which binds the negative electrode materials to each other. Examples of the binding agent may include polytetrafluoroethylene (PTFE), polyvinylidene fluoride (PVdF), an ethylene-propylene-diene copolymer (EPDM), styrene-butadiene rubber (SBR), polyimide, polyaramide, and the like. Further, the binding agent may be used in combination of two or more thereof. If a combination of a binding agent which is excellent in binding the active materials to each other and a binding agent which is excellent in binding the active materials to the current collector, or a combination of a binding agent which has an excellent hardness and a binding agent which has an excellent flexibility is used, a negative electrode having excellent life characteristics may be manufactured.

In addition, the negative electrode active material layer may include a conductive agent. Examples of the conductive agent include acetylene black, carbon black, graphite, and the like.

As the current collector, a conductive substrate having a porous structure or non-perforated conductive substrate may be used. These conductive substrates may be formed of, for example, copper, stainless steel or nickel. The thickness of the current collector may be in a range of 5 µm to 20 µm. If the thickness of the current collector falls in this range, a good balance between the strength of the electrode and weight reduction is obtained.

The negative electrode 3 is manufactured by suspending, for example, the active material, the conductive agent, and the binding agent in a solvent which is universally used to prepare slurry, applying and drying the slurry on the current collector 3a and then pressing the slurry. The negative electrode 3 may also be manufactured by forming the active material, the conductive agent, and the binding agent into a pellet shape to make a negative electrode layer 3b and forming the positive electrode layer 3b on the current collector 3a.

4) Electrolyte

As an electrolyte, a non-aqueous electrolytic solution, an electrolyte impregnation-type polymer electrolyte, polymer electrolyte or inorganic solid electrolyte may be used.

The non-aqueous electrolytic solution is a liquid electrolytic solution prepared by dissolving an electrolyte in a non-aqueous solvent, and is held in a gap between electrode groups.

As the non-aqueous solvent, a mixed solvent of propylene carbonate (PC) or ethylene carbonate (EC) and a non-aqueous solvent (hereinafter, may be referred to as a second solvent) which has a lower viscosity than PC or EC is preferably used.

As the second solvent, for example, chain carbonates are preferable. Examples of the chain carbonates include dimethyl carbonate (DMC), methyl ethyl carbonate (MEC), diethyl carbonate (DEC), ethyl propionate, methyl propionate, γ-butyrolactone (BL), acetonitrile (AN), ethyl acetate (EA), toluene, xylene, methyl acetate (MA), or the like. These second solvents may be used either alone or in combinations of two or more solvents. Particularly, the second solvent preferably has a donor number of 16.5 or less.

The viscosity of the second solvent is preferably 2.8 cmp or less at 25° C. The blending amount of ethylene carbonate or propylene carbonate in the mixed solvent is preferably from 1.0% to 80% by volume. The blending amount of ethylene carbonate or propylene carbonate is more preferably 20% to 75% by volume.

Examples of the electrolyte included in the non-aqueous electrolytic solution include lithium salts (electrolytes) such as lithium perchlorate ($LiClO_4$), lithium hexafluorophosphate ($LiPF_6$), lithium borofluoride ($LiBF_4$), lithium hexafluoroarsenate ($LiAsF_6$), lithium trifluoromethasulfonate ($LiCF_3SO_3$), lithium bistrifluoromethylsulfonylimide [$LiN(CF_3SO_2)_2$], and the like. Among them, $LiPF_6$ or $LiBF_4$ is preferably used.

The amount of electrolyte dissolved in a non-aqueous solvent is preferably from 0.5 mol/L to 2.0 mol/L.

5) Separator

When a non-aqueous electrolytic solution or an electrolyte impregnation-type polymer electrolyte is used, a separator may be used. As the separator, a porous separator is used. As the material for the separator, for example, a porous film including polyethylene, polypropylene or polyvinylidene fluoride (PVdF), a nonwoven fabric made of a synthetic resin, or the like may be used. Among the material for separator, a porous film made of polyethylene, polypropylene or both of polyethylene and polypropylene is preferable because the film may improve the safety of a secondary battery cell.

The thickness of the separator is preferably 30 µm or less. If the thickness exceeds 30 µm, a distance between the positive and negative electrodes is increased, and thus, the internal resistance may be increased. Further, the lower limit of the thickness of the separator is preferably 5 µm. If the thickness is less than 5 µm, the strength of the separator is significantly reduced, and thus, the internal short-circuiting may occur easily. The upper limit and the lower limit of the thickness of the separator are more preferably 25 µm and 10 µm, respectively.

The separator preferably has a thermal shrinkage ratio of 20% or less when the separator is kept under a condition of 120° C. for 1 hr. If the thermal shrinkage ratio exceeds 20%, the possibility of short-circuiting due to heating is increased. The thermal shrinkage ratio of the separator is more preferably 15% or less.

The separator preferably has a porosity in a range of from 30% to 70%. This is based on the following reasons. If the porosity is less than 30%, there is a concern that it is difficult to obtain a high ability of holding an electrolyte in the separator. Meanwhile, if the porosity exceeds 60%, there is a concern that sufficient separator strength may not be obtained. The porosity of the separator is more preferably in the range of 35% to 70%.

The separator preferably has an air permeability of 500 sec/1.00 $cm^3$ or less. If the air permeability exceeds 500 sec/1.00 $cm^3$, there is a concern that it is difficult to obtain high lithium ion mobility in the separator. Further, the lower limit of the air permeability is 30 sec/1.00 $cm^3$. If the air permeability is less than 30 sec/1.00 $cm^3$, there is a concern that sufficient separator strength may not be obtained.

The upper limit and the lower limit of the air permeability of the separator are more preferably 300 sec/1.00 $cm^3$ and 50 sec/1.00 $cm^3$, respectively.

In the negative electrode active material for a non-aqueous secondary battery cell according to the first embodiment, a metal or lithium silicate is dispersed in a composite including three phases of Si, $SiO_2$, and a carbonaceous material. With the negative electrode active material, high charge-discharge capacity, a long cycle life, and excellent high-current characteristics can be simultaneously achieved. Thus, if the non-aqueous electrolyte secondary battery cell according to the second embodiment uses the negative electrode active material according to the first embodiment, a long-service life and an improved discharge capacity can be realized.

Third Embodiment

Subsequently, a battery pack according to a third embodiment will be described.

The battery pack according to the third embodiment has one or more of the non-aqueous electrolyte secondary battery cells (that is, single cells) according to the second embodiment. When a plurality of single cells are included in the battery pack, each single cell is disposed to be electrically connected in series, in parallel or in a combination of series and parallel.

A battery pack (200) will be described in detail with reference to FIGS. 3 and 4. In the battery pack 200 shown in FIG. 3, a flat non-aqueous electrolytic battery cell shown in FIG. 1 is used as each single cell 21.

A plurality of single cells 21 are laminated such that the negative electrode terminal 6 and the positive electrode terminal 7, which are extended to the outside, are arranged neatly in the same direction, and the single cells 21 are bound with an adhesive tape 22 to constitute an assembled battery 23. These single cells 21 are electrically connected to one another in series, as shown in FIG. 4.

A printed wiring board 24 is disposed to be opposed to the side surfaces of the single cells 21 from which the negative electrode terminal 6 and the positive electrode terminal 7 extend. As shown in FIG. 4, a thermistor 25, a protection circuit 26, and a terminal 27 for electrical connection to an external device are mounted on the printed wiring board 24. Meanwhile, in order to prevent unnecessary connection to the wirings of the assembled battery 23, an insulating plate (not shown) is attached to a surface of the protection circuit board 24, which opposes the assembled battery 23.

A positive-electrode-side lead 28 is connected to the positive electrode terminal 7 which is located at the lowest layer of the assembled battery 23. One end of the lead 28 is inserted into and electrically connected to a positive-electrode-side connector 29 of the printed wiring board 24. A negative-electrode-side lead 30 is connected to the negative electrode terminal 6, which is located at the highest layer of the assembled battery 23. One end of the lead 30 is inserted into and electrically connected to a positive-electrode-side connector 31 of the printed wiring board 24. These connectors 29 and 31 are connected to the protection circuit 26 through wirings 32 and 33 formed on the printed wiring board 24.

The thermistor 25 is used for detecting the temperatures of the single cells 21. Detection signals of the thermistor 25 are transmitted to the protection circuit 26. The protection circuit 26 may cut off a positive-side wiring 34a and a negative-side wiring 34b between the protection circuit 26 and the terminal 27 for electrical connection to an external device under a predetermined condition. The term "predetermined condition" herein may refer to a condition under which the temperature(s) detected by the thermistor 25 becomes a predetermined temperature or higher, for example. Further, the term "predetermined condition" herein may also refer to a condition under which over-charging, over-discharging, over-current, or the like of the single cell(s) 21 is detected. Detection of the over-charging, over-current, and the like is performed for the individual single cells 21 or all of the single cells 21. When the detecting process for the individual single cells 21 is performed, either a voltage of each cell 21 may be detected or an electrical potential of the positive or negative electrode thereof may be detected. In the latter case, lithium electrodes used as reference electrodes are inserted into the individual single cells 21. As shown in FIGS. 3 and 4, a wiring 35 for voltage detection is connected to each single cell 21, and detection signals are transmitted to the protection circuit 26 through this wiring 35.

Protective sheets 36 made of a rubber or a resin are disposed on three side surfaces of the assembled battery 23 excluding side surfaces where the positive electrode terminal 7 and the negative electrode terminal 6 protrude.

The assembled battery 23 is housed in a storage container 37 together with each protective sheet 36 and the printed wiring board 24. That is, the protective sheets 36 are disposed on the both inner side surfaces, extending along a direction of the longer side of the storage container 37, of the storage container 37 and one inner side surface, extending in a direction of the shorter side thereof, of the storage container. The printed wiring board 24 is disposed on the other inner side surface, extending in the direction of the shorter side thereof, of the storage container 37. The assembled battery 23 is located in a space surrounded by the protective sheets 36 and the printed wiring board 24. A cover 38 is attached to the top of the storage container 37.

Meanwhile, a thermally shrinkable tape may be used to fix the assembled battery 23 instead of the adhesive tape 22. In this case, the protective sheets are disposed on the both side surfaces of the assembled battery 23, and then the thermally shrinkable tape is wound to surround the protective sheets, after which the thermally shrinkable tape is thermally shrunk, thereby fastening the assembled battery 23.

Figure 3:
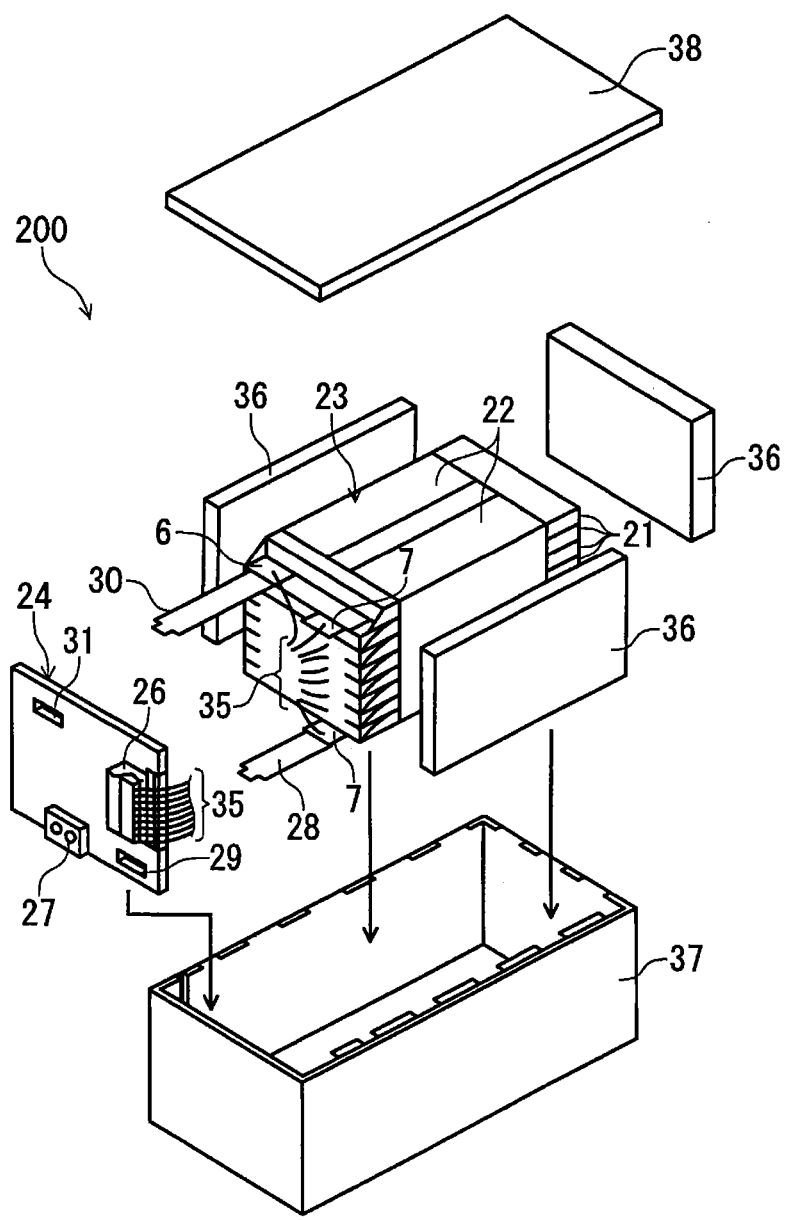
FIG. 3 is an exemplary exploded perspective view showing a battery pack according to a third embodiment.
Figure 4:
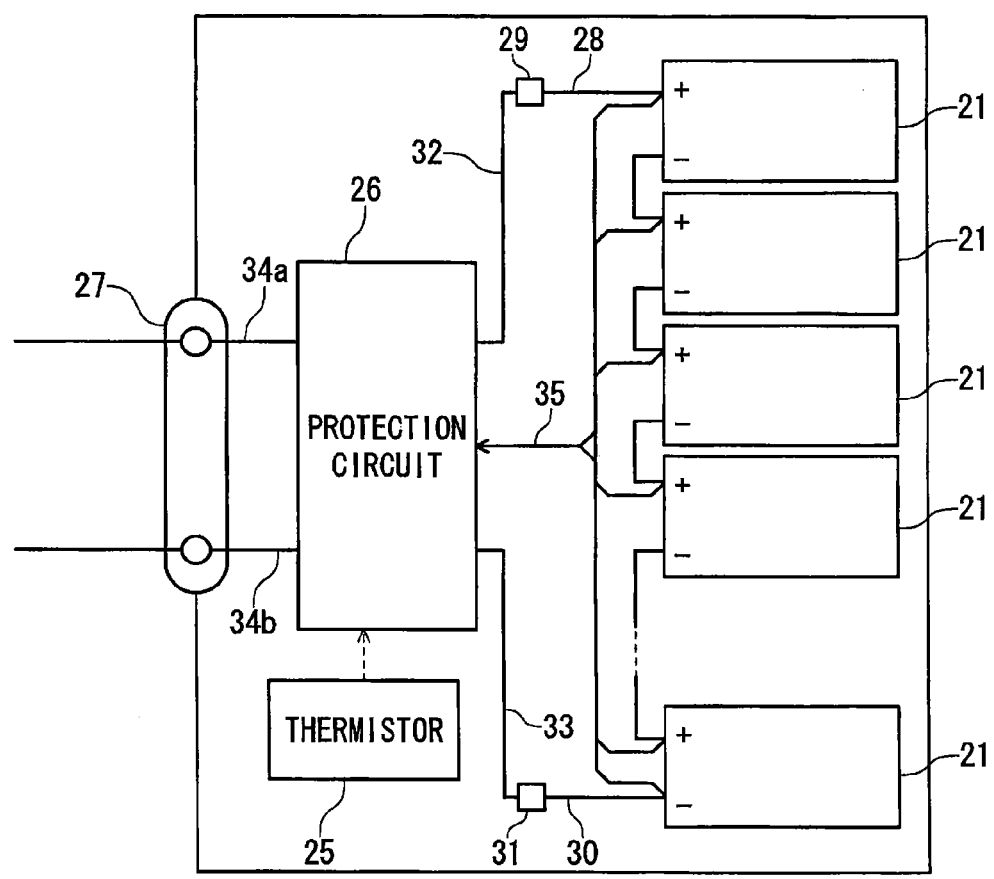
FIG. 4 is an exemplary block diagram showing an electric circuit of the battery pack in FIG. 3.

FIGS. 3 and 4 illustrate that the single cells 21 are connected to one another in series. However, the single cells may be connected to one another in parallel or in a combination of in series and in parallel in order to increase the capacity of the battery pack. The assembled battery pack may also be connected to one another in series or in parallel.

According to the third embodiment, a battery pack having an excellent charge-discharge cycle performance can be provided with being equipped with the non-aqueous electrolyte secondary battery cells having the excellent charge-discharge cycle performance as in the second embodiment.

Meanwhile, the form of the battery pack may be appropriately modified depending on the intended use thereof. Such an intended use of the battery pack is preferable that the battery pack exhibits excellent cycle characteristics when high current is drawn out therefrom. Specific examples of the intended use of the battery pack include a battery pack for a power source of a digital camera or a battery package for an on-vehicle type power source of a two-wheeled to four-wheeled hybrid electric vehicle, a two-wheeled to four-wheeled electric vehicle, or an assisted bicycle, and the like. In particular, a battery pack using a non-aqueous electrolyte secondary battery cell(s) having excellent high temperature characteristics are suitably used for an on-vehicle type power source.

EXAMPLES

Hereinafter, specific examples (in which a battery cell described with reference to FIG. 1 was specifically prepared under a condition described in each example) and effects thereof will be described. However, it should be noted that the invention is not limited to the following examples.

Example 1

A negative electrode active material was obtained by pulverizing and kneading SiO, forming a composite, and sintering the composite under Ar gas atmosphere, under the following conditions.

SiO was pulverized as follows. The raw material SiO powder was subjected to pulverization treatment by a continuous bead mill device for a predetermined time by using beads having a bead diameter of 0.5 mm and ethanol as a dispersion medium. Further, SiO fine powders were prepared by pulverizing the SiO powder by a planetary ball mill with balls having a size of 0.1 mm and ethanol as a dispersion medium.

The SiO fine powders obtained by the fine pulverization treatment and graphite powder having a size of 6 μm were composited with hard carbon in the following manner. 2.8 g of the SiO powder, 0.7 g of graphite powder, and 0.06 g of carbon fibers having a mean diameter of 180 nm were added to a mixed solution of 4.0 g of furfuryl alcohol, 10 g of ethanol and 0.125 g of water, and the resulting mixture was kneaded with a kneading machine to obtain a precursor mixture. 0.2 g of dilute hydrochloric acid serving as a polymerization catalyst of furfuryl alcohol was added to the precursor mixture after the kneading, and then the resulting mixture was left at room temperature, dried, and solidified to obtain a carbon composite.

The carbon composite thus obtained was sintered in Ar gas at 1,150° C. for 3 hours, cooled to room temperature, pulverized, and sifted with a sieve whose openings have a diameter of 30 μm to obtain a negative electrode active material.

As for the active material obtained in Example 1, charge-discharge characteristics and physical properties were evaluated by performing a charge-discharge test and an X-ray diffraction measurement, which will be described below.

(Charge-Discharge Test)

15% by mass of graphite having a mean diameter of 6 μm and 8% by mass of polyimide were added to the obtained sample and kneaded using N-methylpyrrolidone as a dispersion medium, and the resulting kneaded slurry was coated on a copper foil having a thickness of 12 μm, which was then dried and compressed with a roller press. Then, the compressed copper foil onto which the slurry was coated was subjected to a thermal treatment at 250° C. for 2 hours in Ar gas and was cut in a predetermined size, and then dried under vacuum at 100° C. for 12 hours to make a test electrode. A beaker cell, in which the test electrode was used as a working electrode, a counter electrode and a reference electrode were made of metal Li, and solution of $LiPF_6$ (1 M) in ethylene carbonate (EC) and diethyl carbonate (DEC) (a ratio by volume of EC:DEC=1:2) was used as an electrolytic solution, was assembled in an Ar atmosphere and subjected to a charge-discharge test. As to a condition for the charge-discharge test, a charge process was carried out at a current density of 1 mA/cm² until a difference in electric potential between the reference electrode and the test electrode reached 0.01 V, and a constant voltage charge process was carried out at 0.01 V for 16 hours. Also, a discharge processing was carried out at a current density of 1 mA/cm² until the difference in electric potential between the reference electrode and the test electrode reached 1.5 V. Further, a charge-discharge cycle having (i) a charge process which was carried out at a current density of 1 mA/cm² until a difference in electric potential between the reference electrode and the test electrode reached 0.01 V, and a constant voltage charge process was carried out at 0.01 V for 16 hours and (ii) a discharge process that was carried out at a current density of 1 mA/cm² until 1.5 V was repeated 100 times, and then the capacity retention ratio of the discharge capacity of the 100th cycle with respect to the 1st cycle was measured.

(X-Ray Diffraction Measurement)

The obtained powder sample was subjected to powder X-ray diffraction measurement to measure a half-value width of a peak of the Si (220) plane. The measurement was carried out by using an X-ray diffraction measuring device manufactured by MAC Science Co., Ltd. (Model M18XHF22) under the following conditions.

Counter cathode: Cu
Tube voltage: 50 kv
Tube current: 300 mA
Scanning speed: 1° (2θ)/min
Time constant: 1 sec
Receiving slit: 0.15 mm
Divergence slit: 0.5°
Scattering slit: 0.5°

The half-value width (2θ) of the peak of the plane index (220) of Si which appeared at d=1.92 Å (2θ=47.2°) was measured from the diffraction pattern. Further, when the peak of Si (220) overlapped with the peaks of another substance contained in the active material, the peaks were isolated from each other to measure the half-value width.

(Measurement of Mean Size of Silicon Oxide Phase)

A section electron microscope photograph was taken for a composite sample after sintering. The photographed image was analyzed by a SEM image analysis software (Mac-VIEW (registered trademark) manufactured by Mountech Co., Ltd.) to obtain particle diameter distribution data. From the obtained particle diameter distribution data, a mean size (mean volume diameter) of silicon oxide phase of the composite sample, a standard deviation of the silicon oxide phase of the composite sample which is defined as (d84%−d16%)/2, and a value of (the standard deviation/the mean size) were calculated.

Table 1 shows a temperature at which the silicon-silicon oxide-carbon composite was sintered, a time period for which the composite was sintered, an additive amount of carbon nanofiber (CNF; % by weight), a measurement result of the half-value width of the Si (220) peak obtained from the power X-ray diffraction, a measurement result of a mean size of the silicon oxide phase of the sintered composite sample, a standard deviation of measured sizes of the silicon oxide phase of the sintered composite sample, a ratio of the standard deviation to the mean size, a discharge capacity obtained in the charge-discharge test, and a cycle characteristic (a retention ratio of the discharge capacity after 100 cycles (%)).

Table 1 also illustrates following examples and comparative examples. For the following examples and comparative examples, only parts different from example 1 will be described, and the descriptions for the other portions such as the synthesis and evaluation procedures performed in the same manner as in example 1 will be omitted.

Example 2

Synthesis was performed to obtain an active material in the same manner as in example 1, except that in the pulverization of SiO, the treatment time by the planetary ball mill after the continuous bead mill was increased by two times.

Example 3

Synthesis was performed to obtain an active material in the same manner as in example 1, except that in the pulverization of SiO, the treatment time by the planetary ball mill after the continuous bead mill was increased by four times.

Example 4

In the pulverization of SiO, pulverization was performed for a predetermined time by the continuous bead mill with using balls having a size of 2 μm and ethanol as a dispersion medium, and the SiO fine powder was obtained without being subjected to the planetary ball mill treatment.

2.8 g of the SiO powder was added to a mixed solution of 4.0 g of furfuryl alcohol, 10 g of ethanol, and 0.125 g of water, and then kneaded in the same manner as in example 1.

The drying solidification, sintering and pulverization were performed in the same manner as in example 1 to obtain a negative electrode active material.

Example 5

Synthesis was performed in the same manner as in example 4 to obtain an active material, except that in the pulverization of SiO, the treatment time by the continuous bead mill was increased by twice.

Example 6

Synthesis was performed in the same manner as in example 4 to obtain an active material, except that in the pulverization of SiO, the treatment time by the continuous bead mill was increased by four times and 0.06 g of carbon fibers having a mean diameter of 180 nm were added to the precursor mixture.

Example 7

Synthesis was performed in the same manner as in example 1 to obtain an active material, except that the sintering temperature and the treatment time were set to 950° C. and 6 hours, respectively.

Example 8

Synthesis was performed in the same manner as in example 2 to obtain an active material, except that the sintering temperature and the treatment time were set to 950° C. and 6 hours, respectively.

Example 9

Synthesis was performed in the same manner as in example 3 to obtain an active material, except that the sintering temperature and the treatment time were set to 950° C. and 6 hours, respectively.

Example 10

Synthesis was performed in the same manner as in example 4 to obtain an active material, except that the sintering temperature and the treatment time were set to 920° C. and 6 hours, respectively.

Example 11

Synthesis was performed in the same manner as in example 5 to obtain an active material, except that the sintering temperature and the treatment time were set to 920° C. and 6 hours, respectively.

Example 12

Synthesis was performed in the same manner as in example 6 to obtain an active material, except that the sintering temperature and the treatment time were set to 920° C. and 6 hours, respectively.

Example 13

In the pulverization of SiO, pulverization was performed by the continuous bead mill with using balls having a size of 0.3 mm and ethanol as a dispersion medium.

2.8 g of the obtained SiO fine powder and 0.7 g of graphite powder were added to a mixed solution of 4.0 g of furfuryl alcohol, 10 g of ethanol, and 0.125 g of water and kneaded in the same manner as in example 1, and diluted hydrochloric acid was added thereto to dry and solidify the resulting mixture.

Sintering and pulverization were performed in the same manner as in example 1 to obtain an active material, except that the sintering temperature was set to 1,050° C.

Example 14

In the pulverization of SiO, pulverization was performed by the continuous bead mill with using balls having a size of 0.3 mm and ethanol as a dispersion medium.

2.8 g of the obtained SiO fine powder, 0.7 g of graphite powder, and 0.03 g of a carbon fiber having a mean diameter of 180 nm were added to a mixed solution of 4.0 g of furfuryl alcohol, 10 g of ethanol, and 0.125 g of water and kneaded in the same manner as in example 1, and diluted hydrochloric acid was added thereto to dry and solidify the resulting mixture.

Sintering and pulverization were performed in the same manner as in example 1 to obtain an active material, except that the sintering temperature was set to 1,050° C.

Example 15

In the pulverization of SiO, pulverization was performed by the continuous bead mill with using balls having a size of 0.3 mm and ethanol as a dispersion medium.

2.8 g of the obtained SiO fine powder, 0.7 g of graphite powder, and 0.06 g of a carbon fiber having a mean diameter of 180 nm were added to a mixed solution of 4.0 g of furfuryl alcohol, 10 g of ethanol, and 0.125 g of water and kneaded in the same manner as in example 1, and diluted hydrochloric acid was added thereto to dry and solidify the resulting mixture.

Sintering and pulverization were performed in the same manner as in example 1 to obtain an active material, except that the sintering temperature was set to 1,050° C.

Example 16

In the pulverization of SiO, pulverization was performed by the continuous bead mill with using balls having a size of 0.3 mm and ethanol as a dispersion medium.

2.8 g of the obtained SiO fine powder, 0.7 g of graphite powder, and 0.18 g of a carbon fiber having a mean diameter of 180 nm were added to a mixed solution of 4.0 g of furfuryl alcohol, 12 g of ethanol, and 0.125 g of water in the same manner as in example 1, and diluted hydrochloric acid was added thereto to dry and solidify the resulting mixture.

Sintering and pulverization were performed in the same manner as in example 1 to obtain an active material, except that the sintering temperature was set to 1,050° C.

Example 17

In the pulverization of SiO, pulverization was performed by the continuous bead mill with using balls having a size of 0.3 mm and ethanol as a dispersion medium.

2.8 g of the obtained SiO fine powder, 0.7 g of graphite powder, and 0.36 g of a carbon fiber having a mean diameter of 180 nm were added to a mixed solution of 4.0 g of furfuryl alcohol, 12 g of ethanol, and 0.125 g of water and kneaded in the same manner as in example 1, and diluted hydrochloric acid was added thereto to dry and solidify the resulting mixture.

Sintering and pulverization were performed in the same manner as in example 1 to obtain an active material, except that the sintering temperature was set to 1,050° C.

Example 18

In the pulverization of SiO, pulverization was performed by the continuous bead mill with using balls having a size of 0.3 mm and ethanol as a dispersion medium.

2.8 g of the obtained SiO fine powder, 0.2 g of graphite powder, and 0.36 g of a carbon fiber having a mean diameter of 180 nm were added to a mixed solution of 2.8 g of furfuryl alcohol, 12 g of ethanol, and 0.125 g of water and kneaded in the same manner as in example 1, and diluted hydrochloric acid was added thereto to dry and solidify the resulting mixture.

Sintering and pulverization were performed in the same manner as in example 1 to obtain an active material, except that the sintering temperature was set to 1,050° C.

Comparative Example 1

Synthesis was performed in the same manner as in example 1 to obtain an active material, except that the sintering temperature and the treatment time were set to 1,200° C. and 3 hours, respectively.

Comparative Example 2

Synthesis was performed with the same manner as in example 4 to obtain an active material, except that the sintering temperature and the treatment time were set to 1,250° C. and 3 hours, respectively.

Comparative Example 3

Synthesis was performed in the same manner as in example 1 to obtain an active material, except that the sintering temperature and the treatment time were set to 880° C. and 8 hours, respectively.

Comparative Example 4

Synthesis was performed in the same manner as in example 4 to obtain an active material, except that the sintering temperature and the treatment time were set to 880° C. and 8 hours, respectively.

Comparative Example 5

Synthesis was performed in the same manner as in example 1 to obtain an active material, except that in the pulverization of SiO, the treatment time by the planetary ball mill after the continuous bead mill was increased by eight times.

Comparative Example 6

Synthesis was performed in the same manner as in example 10 to obtain an active material, except that in the pulverization of SiO, the treatment time by the continuous bead mill was set to 70% of that in example 10.

Comparative Example 7

Synthesis was performed in the same manner as in example 4 to obtain an active material, except that in the pulverization of SiO, the SiO fine powder was obtained by the planetary ball mill with using balls having a size of 2 mm and ethanol as a dispersion medium and by performing pulverization for a predetermined time.

Comparative Example 8

Synthesis was performed in the same manner as in the comparative example 7 to obtain an active material, except that the sintering temperature and the treatment time were set to 920° C. and 8 hours, respectively.

Comparative Example 9

An amorphous SiO powder having a mean particle diameter of 30 μm and a graphite powder having a mean particle diameter of 6 μm were prepared as raw materials, and a ball mill (manufactured by FRITSCH CO., Model Number P-5) was used to carry out pulverization and mixing. When the ball mill was used, a stainless steel container having a volume of 250 ml and a 10 mmϕ ball was used. The input amount of the sample was 20 g, and the mixing ratio of SiO and graphite was 3:1. Further, furfuryl alcohol was prepared as a carbon material precursor. The mixture ratio of SiO:graphite:furfuryl alcohol was 3:1:10 by mass. To the furfuryl alcohol, 1/10 by mass of water based on the mass of the furfuryl alcohol was added. Graphite and SiO were subsequently added, and the resulting mixture was stirred. After that, 1/10 by mass of diluted hydrochloric acid was added thereto based on the mass of the furfuryl alcohol, and the resulting mixture was left after the stirring to be polymerized and solidified.

The obtained solid material was sintered in Ar gas at the sintering temperature and the sintering time as shown in Table 1, cooled to a room temperature, pulverized by a pulverizer, and sifted by a sieve whose openings have a diameter of 30 μm to obtain a negative electrode active material.

TABLE 1

| | | | | Active material | | | | Cycle |
|---|---|---|---|---|---|---|---|---|
| | Sintering Temperature (° C.) | Sintering Time (hour) | Additive amount of CNF (% by weight) | Half-width value of peak of Si (220) (°) | Mean size (nm) | Standard deviation (nm) | (Standard deviation)/ (Mean size) | Discharge capacity (mAh/g) | characteristic capacity retention ratio after 100 cycles (%) |
| Example 1 | 1150 | 3 | 1 | 1.5 | 67 | 66 | 0.99 | 940 | 82 |
| Example 2 | 1150 | 3 | 1 | 1.5 | 56 | 30 | 0.54 | 934 | 90 |
| Example 3 | 1150 | 3 | 1 | 1.5 | 50 | 20 | 0.40 | 924 | 95 |
| Example 4 | 1100 | 3 | 0 | 1.5 | 1000 | 980 | 0.98 | 1060 | 80 |
| Example 5 | 1100 | 3 | 0 | 1.5 | 972 | 505 | 0.52 | 1077 | 85 |
| Example 6 | 1100 | 3 | 1 | 1.5 | 941 | 344 | 0.37 | 1086 | 91 |
| Example 7 | 950 | 6 | 1 | 8.0 | 65 | 60 | 0.92 | 902 | 81 |
| Example 8 | 950 | 6 | 1 | 8.0 | 57 | 33 | 0.58 | 900 | 85 |
| Example 9 | 950 | 6 | 1 | 8.0 | 51 | 21 | 0.41 | 898 | 90 |

TABLE 1-continued

|  | Sintering Temperature (° C.) | Sintering Time (hour) | Additive amount of CNF (% by weight) | Active material | | | | | Cycle characteristic capacity retention ratio after 100 cycles (%) |
|---|---|---|---|---|---|---|---|---|---|
|  |  |  |  | Half-width value of peak of Si (220) (°) | Mean size (nm) | Standard deviation (nm) | (Standard deviation)/ (Mean size) | Discharge capacity (mAh/g) |  |
| Example 10 | 920 | 6 | 0 | 8.0 | 982 | 963 | 0.98 | 988 | 78 |
| Example 11 | 920 | 6 | 0 | 8.0 | 968 | 509 | 0.53 | 941 | 82 |
| Example 12 | 920 | 6 | 1 | 8.0 | 945 | 355 | 0.38 | 946 | 88 |
| Example 13 | 1050 | 3 | 0 | 2.2 | 298 | 152 | 0.51 | 1037 | 85 |
| Example 14 | 1050 | 3 | 0.5 | 2.2 | 303 | 145 | 0.48 | 1042 | 90 |
| Example 15 | 1050 | 3 | 1 | 2.2 | 289 | 141 | 0.49 | 1078 | 95 |
| Example 16 | 1050 | 3 | 3 | 2.2 | 294 | 146 | 0.50 | 1030 | 90 |
| Example 17 | 1050 | 3 | 6 | 2.2 | 296 | 143 | 0.48 | 967 | 90 |
| Example 18 | 1050 | 3 | 8 | 2.2 | 296 | 143 | 0.48 | 992 | 77 |
| Comp. Exa. 1 | 1200 | 3 | 1 | 1.4 | 59 | 57 | 0.97 | 590 | 55 |
| Comp. Exa. 2 | 1250 | 3 | 0 | 1.4 | 950 | 503 | 0.53 | 610 | 44 |
| Comp. Exa. 3 | 880 | 8 | 1 | 8.1 | 62 | 58 | 0.94 | 743 | 59 |
| Comp. Exa. 4 | 880 | 8 | 0 | 8.1 | 960 | 504 | 0.53 | 770 | 40 |
| Comp. Exa. 5 | 1150 | 3 | 1 | 1.5 | 40 | 36 | 0.90 | 820 | 64 |
| Comp. Exa. 6 | 920 | 6 | 0 | 8.0 | 1060 | 1011 | 0.95 | 930 | 65 |
| Comp. Exa. 7 | 1100 | 3 | 0 | 1.5 | 988 | 1144 | 1.16 | 1050 | 70 |
| Comp. Exa. 8 | 920 | 6 | 0 | 8.0 | 982 | 1110 | 1.13 | 915 | 65 |
| Comp. Exa. 9 | 1000 | 3 | 0 | 2.4 | 3500 | 3300 | 0.94 | 710 | 72 |

As can be seen from Table 1, the secondary batteries having the negative electrode active materials of examples 1 to 18 are excellent in discharge capacity and capacity retention ratio after 100 cycles, in which the half-width value on the Si (220) plane is in a range of 1.5° to 8°, the mean size of the silicon oxide phase is equal to or more than 50 nm and equal to or less than 1,000 nm, and (standard deviation of a size distribution of the silicon oxide phase)/(mean size of the silicon oxide phase) is equal to or less than 1.0 where the standard deviation of the size distribution of the silicon oxide phase is defined by the expression of (d84%–d16%)/2.

In contrast, the capacity retention ratio after 100 cycles of the secondary batteries having the negative electrode active materials of the comparative examples 1 to 9 are smaller than that of examples 1 to 18, in which the half-value width on the Si (220) plane of the negative electrode materials of the comparative examples 1 to 4 is less than 1.5° or more than 8°, a mean size of the silicon oxide phase of the negative electrode active materials of the comparative examples 5, 6, and 9 is less than 50 nm and more than 1,000 nm, and (the standard deviation of the size distribution of the silicon oxide phase)/(the mean size of the silicone oxide phase) of the negative electrode active materials of the comparative examples 7 and 8 is more than 1.0.

Although embodiments of the invention have been described, the invention is not limited thereto and may be variously modified within the scope of the gist of the invention claimed in the claims. In addition, it is possible to variously modify the invention within a range without departing from the gist in the practicing stage. Furthermore, various inventions may be made by appropriately combining a plurality of constituting elements disclosed in the embodiments.

What is claimed is:

1. A negative electrode active material comprising:
a composite comprising:
a carbonaceous material,
a silicon oxide dispersed in the carbonaceous material,
a silicon dispersed in the silicon oxide, and
a carbon fiber having a mean diameter equal to or less than 1,000 nm, present in a range of 0.1 mass percent to 8 mass percent based on the total mass of the composite, wherein a half-value width of a diffraction peak of a Si (220) plane in powder X-ray diffraction measurement of the composite is in a range of 1.5° to 8.0°,
a mean size of a silicon oxide phase is in a range of 50 nm to 1,000 nm, and
a value of (a standard deviation)/(the mean size) is equal to or less than 1.0 where the standard deviation of a size distribution of the silicon oxide phase is defined by (d84%–d16%)/2.

2. The negative electrode active material according to claim 1, wherein the mean size of the silicon oxide phase is in a range of 100 nm to 500 nm.

3. A non-aqueous electrolyte secondary battery cell comprising:
a negative electrode comprising the negative electrode active material according to claim 1;
a positive electrode comprising a positive electrode active material; and
a non-aqueous electrolyte.

4. The non-aqueous electrolyte secondary battery cell according to claim 3, further comprising:
an outer case formed of a laminate film.

5. A battery pack comprising at least one non-aqueous electrolyte secondary battery cell according to claim 3.

6. A battery pack, comprising:
a plurality of non-aqueous electrolyte secondary battery cells according to claim 3; and
a protection circuit configured to detect a voltage of each non-aqueous electrolyte battery cell.

7. A method for preparing the negative electrode active material according to claim 1, the method comprising:
mixing SiO powder having a mean particle diameter in a range of 50 nm to 500 nm with a carbon precursor or a carbonaceous material in a liquid-phase dispersion medium;
drying and solidifying a resultant mixture; and
sintering the dried and solidified mixture.

8. The negative electrode active material according to claim 1, wherein an amount of the carbon fiber included in the composite is in a range of 0.5 mass percent to 5 mass percent.

9. The negative electrode active material according to claim 1, wherein lithium silicate is dispersed on a surface of the silicon oxide phase or in the silicon oxide phase.

10. The negative electrode active material according to claim 1, wherein the negative electrode active material has a particle diameter in a range of 5 μm to 100 μm.

11. The negative electrode active material according to claim 1, wherein the negative electrode active material has a specific surface area of 0.5 m²/g or more and 10 m²/g or less.

12. The negative electrode active material according to claim 1, wherein a molar ratio between Si and carbon is in a range of $0.2 \leq Si/(the\ carbon) \leq 2$, and a molar ratio between a Si phase and a $SiO_2$ phase is in a range of $0.6 \leq (the\ Si\ phase)/(the\ SiO_2\ phase) \leq 1.5$.

* * * * *